United States Patent
Serkh

(10) Patent No.: US 7,316,628 B2
(45) Date of Patent: Jan. 8, 2008

(54) TWO SPEED TRANSMISSION AND BELT DRIVE SYSTEM

(75) Inventor: Alexander Serkh, Troy, MI (US)

(73) Assignee: The Gates Corporation IP Law Dept., Denver, CO (US)

(*) Notice: Subject to any disclaimer, the term of this patent is extended or adjusted under 35 U.S.C. 154(b) by 49 days.

(21) Appl. No.: 10/756,079

(22) Filed: Jan. 13, 2004

(65) Prior Publication Data

US 2005/0153813 A1  Jul. 14, 2005

(51) Int. Cl.
*F16H 3/44* (2006.01)
(52) U.S. Cl. ................................ 475/312; 475/314
(58) Field of Classification Search ............... 475/312, 475/313, 154, 900, 311; 180/53.7, 53.8
See application file for complete search history.

(56) References Cited

U.S. PATENT DOCUMENTS

| | | | | |
|---|---|---|---|---|
| 2,327,769 A | * | 8/1943 | Claytor | 475/156 |
| 2,771,795 A | * | 11/1956 | Palmer | 475/301 |
| 2,987,943 A | * | 6/1961 | Lemieux et al. | 475/94 |
| 3,038,354 A | * | 6/1962 | Bernard | 475/153 |
| 3,702,083 A | | 11/1972 | Hewko et al. | 74/752 |
| 3,978,742 A | * | 9/1976 | Abbott | 475/266 |
| 4,265,135 A | | 5/1981 | Smirl | 74/336 B |
| 4,305,488 A | | 12/1981 | McIntosh | 192/4 A |
| 4,613,318 A | * | 9/1986 | McWilliam et al. | 474/74 |
| 4,625,587 A | | 12/1986 | Hosono | 74/752 C |
| 4,644,824 A | | 2/1987 | Shimizu | 74/781 R |
| 4,663,989 A | * | 5/1987 | Brodbeck | 475/159 |
| 4,667,537 A | | 5/1987 | Sivalingham | 74/752 |
| 4,685,355 A | | 8/1987 | Kaneyuki | 74/796 |
| 4,706,520 A | | 11/1987 | Sivalingam | 74/781 R |
| 4,800,780 A | * | 1/1989 | Sivalingam | 475/318 |
| 4,854,192 A | | 8/1989 | Churchill et al. | 74/752 |
| 4,862,770 A | | 9/1989 | Smith | 74/789 |
| 4,870,875 A | | 10/1989 | Morishita | 74/785 |
| 4,878,401 A | | 11/1989 | Chung | 74/781 |
| 5,139,468 A | | 8/1992 | Churchill et al. | 475/324 |
| 5,328,419 A | | 7/1994 | Motl et al. | 475/324 |
| 5,358,456 A | | 10/1994 | Deppert et al. | 475/154 |
| 5,378,210 A | * | 1/1995 | Teraoka | 475/312 |
| 5,492,189 A | | 2/1996 | Kriegler et al. | 180/65.2 |
| 5,557,977 A | | 9/1996 | Stockton | 74/15.84 |
| 5,558,173 A | | 9/1996 | Sherman | 180/53.8 |
| 5,558,175 A | | 9/1996 | Sherman | 180/65.2 |
| 5,558,592 A | | 9/1996 | Honlinger et al. | 475/285 |

(Continued)

FOREIGN PATENT DOCUMENTS

DE  100 01 436 A1  8/2000

(Continued)

*Primary Examiner*—Roger Pang
(74) *Attorney, Agent, or Firm*—J. A. Thurnau, Esq.; C. H. Castleman, Esq.; J. L. Mahurin, Esq.

(57) ABSTRACT

A two speed transmission comprising a planetary gear train comprising an input member connected to an input carrier, the input carrier connected to an input shaft, a sun gear and a ring gear, the input carrier comprising a plurality of planetary members each in meshing engagement with the sun gear and the ring gear, the sun gear connected to a brake member, the ring gear connected to an output member, and a one-way clutch operably disposed between the input shaft and the output member.

8 Claims, 10 Drawing Sheets

U.S. PATENT DOCUMENTS

| | | | |
|---|---|---|---|
| 5,635,805 A | 6/1997 | Ibaraki et al. | 318/139 |
| 5,700,212 A | 12/1997 | Meckstroth | 474/70 |
| 5,789,882 A | 8/1998 | Ibaraki et al. | 318/148 |
| 5,801,499 A | 9/1998 | Tsuzuki et al. | 318/141 |
| 5,842,944 A * | 12/1998 | Morishita et al. | 475/154 |
| 5,875,691 A | 3/1999 | Hata et al. | 74/661 |
| 6,008,545 A | 12/1999 | Nagano et al. | 290/46 |
| 6,048,288 A | 4/2000 | Tsujii et al. | 477/5 |
| 6,055,946 A | 5/2000 | Dombek et al. | 123/41.11 |
| 6,183,389 B1 | 2/2001 | Tabata | 477/5 |
| 6,317,665 B1 | 11/2001 | Tabata et al. | 701/22 |
| 6,396,165 B1 | 5/2002 | Nagano et al. | 307/10.6 |
| 6,537,175 B1 | 3/2003 | Blood | 477/44 |
| 6,554,113 B2 | 4/2003 | Li et al. | 192/48.92 |
| 6,609,992 B2 * | 8/2003 | Kusumoto et al. | 475/318 |
| 6,878,092 B1 * | 4/2005 | Schustek et al. | 477/3 |

FOREIGN PATENT DOCUMENTS

| | | |
|---|---|---|
| EP | 0 916 546 A2 | 9/1998 |
| EP | 0 950 557 A2 | 10/1999 |
| WO | WO 01/47739 A1 | 7/2001 |

* cited by examiner

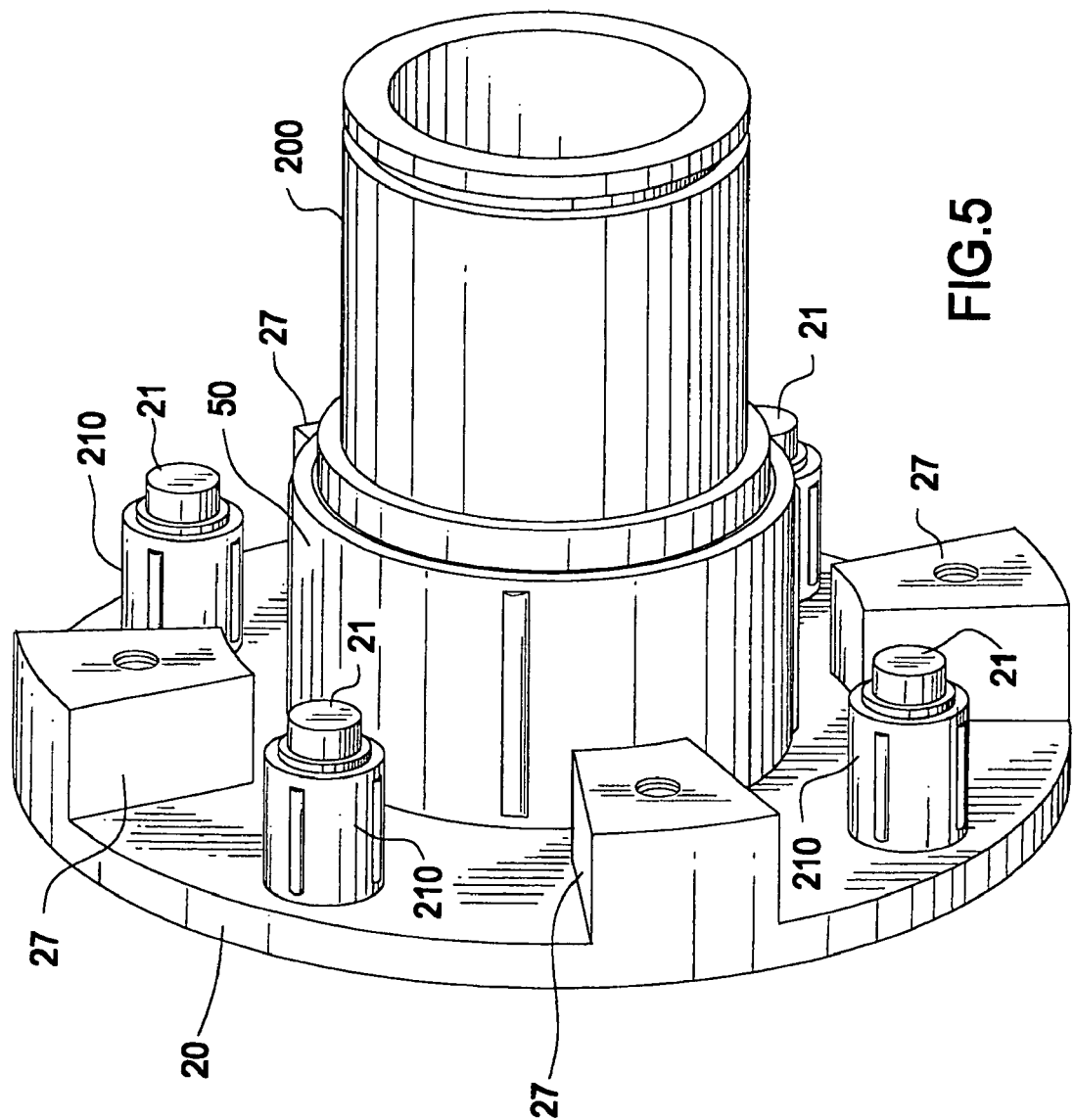

US 7,316,628 B2

TWO SPEED TRANSMISSION AND BELT DRIVE SYSTEM

FIELD OF THE INVENTION

The invention relates to a two speed transmission and belt drive system, more particularly, to a vehicle engine belt drive system using a combination of accessory pulleys and a two speed transmission having an electromagnetic brake. The two speed transmission output pulley in combination with each accessory pulley drives engine accessories at a first speed substantially proportional to an engine speed at engine idle and proportionally less than the first engine speed for those engine speeds substantially greater than an engine idle speed. The transmission also provides a speed reducing unit disposed between an engine and a motor generator.

BACKGROUND OF THE INVENTION

Vehicle engines generally comprise certain accessories that are used in the operation of the engine and vehicle. Such accessories can include a power steering pump, an air conditioning compressor, an alternator, an oil pump, a fuel pump and so on. These accessories are generally driven by a serpentine belt. The serpentine belt engages a pulley on each accessory as well as on an engine crankshaft. The engine crankshaft provides the torque to drive the accessories.

As the belt is driven by the crankshaft it is necessarily subject to engine speed variations during acceleration and deceleration of the vehicle. In other words the operating speed of the accessories is directly proportional to the speed of the engine. The variations in engine speed, particularly engine speeds greater than idle, result in inefficient operation of the accessories because each accessory must be designed to operate satisfactorily over the entire engine speed range. This necessarily means that the efficiency is less than optimum for most of the engine speed range. Therefore it is desirable to decouple some or all of the accessories from the engine crankshaft so they can be driven at a lower and narrower optimum speed range. Further, operating the accessories at relatively higher speeds places a greater load on the engine than if they are operated at a slower speed.

Representative of the art is U.S. Pat. No. 4,862,770 (1989) to Smith which discloses a two-speed gear box adapted to be mounted on the face of an automobile accessory, such as an automotive alternator to increase the speed of the alternator on demand.

The clutch assembly disclosed in Smith comprises a brake band encompassing an outer cylindrical surface. The brake band is operated with mechanical vacuum means which engage or disengage the brake band. Such a system can be adversely affected by loss of vacuum, for example by vacuum hose failure, or by contamination on the cylindrical surface between the brake band and the cylindrical surface.

The prior art transmissions are designed to proportionately reduce the speed of the driven accessories as the engine speed increases above idle. This reduces the accessory power requirement. However, at idle the accessories are operated on a 1:1 basis with no speed reduction as compared to engine speeds above idle.

In recent years, an automatic engine stopping and starting apparatus has been known for stopping an engine after a running vehicle has been stopped and restarting the engine if conditions for driving the vehicle have been satisfied again. The automatic engine stopping and starting apparatus is arranged such that fuel supply to the engine is interrupted while the vehicle is stopped, resulting in reduced fuel consumption.

Representative of the art is U.S. Pat. No. 6,048,288 (2000) to Tsujii et al. which discloses a system that operates a motor when a vehicle is stopped by providing a connection switching unit disposed between the drive shaft of the engine and a rotational shaft of the motor to enable/disable power transmission between the drive shaft of the engine and the rotational shaft of the motor, and a transmission controller that controls a function of the connection switching unit for enabling/disabling power transmission. When an auxiliary machine is operated by a motor while the engine is stopped, control is performed such that rotation of the rotational shaft of the motor is not transmitted to the drive shaft of the engine. The auxiliary machine is operated by the motor without operating the engine.

What is needed is a belt drive system that controls an accessory speed with respect to an engine speed by a combination of a two speed transmission ratio and output pulley and accessory pulley ratio. What is needed is a two speed transmission comprising an electromagnetic brake controlled with respect to an engine condition. What is needed is a two-speed transmission having coaxial input and dual outputs. What is needed is a motor generator system that has a speed reducing unit disposed between the engine and a motor generator. The present invention meets these needs.

SUMMARY OF THE INVENTION

The primary aspect of the invention is to provide a belt drive system that controls an accessory speed with respect to an engine speed by a combination of a two speed transmission ratio and output pulley and accessory pulley ratio.

Another aspect of the invention is to provide a two speed transmission comprising an electromagnetic brake controlled to an engine condition.

Another aspect of the invention is to provide a two-speed transmission having coaxial input and dual outputs.

Another aspect of the invention is to provide a motor generator system that has a speed reducing unit disposed between the engine and a motor generator.

Other aspects of the invention will be pointed out or made obvious by the following description of the invention and the accompanying drawings.

The invention comprises a two speed transmission and belt drive system utilizing the transmission. The two speed transmission comprises a planetary gear train comprising an input pulley connected to an input carrier, and a sun gear and a ring gear. The input carrier also comprises a plurality of planetary gears disposed between the sun gear and the ring gear. The sun gear is engaged with an electromagnetic brake member. The ring gear is engaged with an output pulley. A one-way clutch is disposed between the input carrier and the output shaft. The brake member is engaged at engine idle and is disengaged at engine speeds above idle. When the brake member is engaged the sun gear does not rotate, thereby driving the ring gear and output pulley at a greater speed than the input pulley. An accessory pulley operates with the transmission output pulley resulting in an accessory speed that is proportional to an engine speed at idle. At engine speeds above idle the transmission is disengaged and the output pulley to accessory pulley ratio drives the belt driven accessory at a speed less then an engine speed. An accessory can also be directly connected to the output shaft in conjunction with the output pulley. The transmission can be used with a motor generator system by providing a speed reducing unit disposed between an engine and the motor generator.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 5 is a partial perspective view of the planetary gear bearings and carrier bushings.

DETAILED DESCRIPTION OF THE PREFERRED EMBODIMENT

Figure 1:
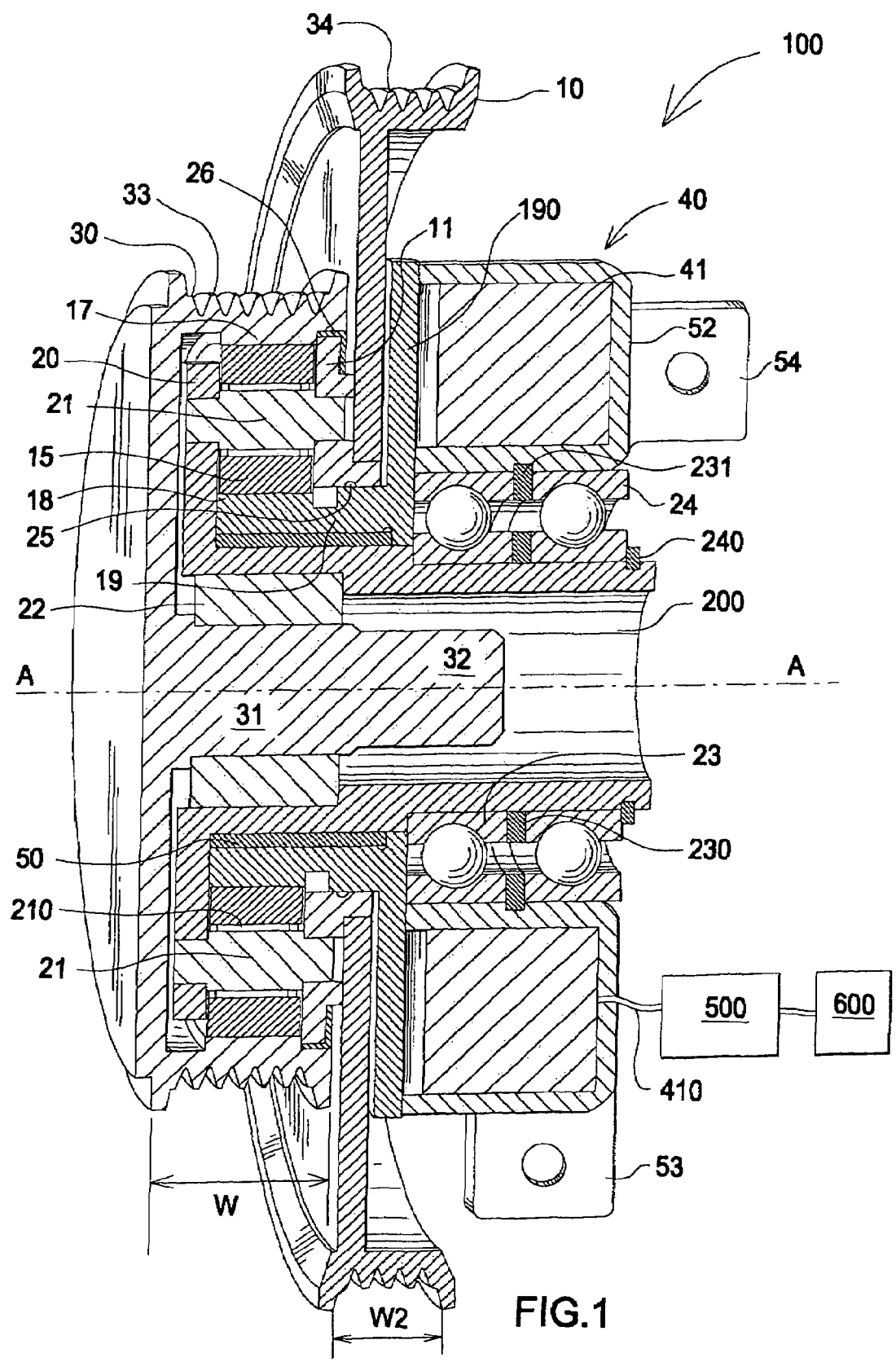
FIG. 1 is a cross-sectional view of the two speed transmission.

FIG. 1 is a cross-sectional view of the two speed transmission. The two speed transmission 100 is used on a belt driven accessory drive of the type used on vehicle internal combustion engines. It may also be used in any application where a two speed transmission is needed, for example, for driving industrial equipment or as a transmission on a 2, 3 or 4 wheeled vehicle.

The transmission and associated control system automatically control an accessory speed based on engine speed in order to optimize engine fuel efficiency and available output drive torque at the drive wheels. The transmission is very compact and can be mounted directly on an accessory, for example on a power steering pump, alternator or air conditioner compressor. In this arrangement the accessory is connected to an engine block.

The two speed transmission 100 comprises planetary gears disposed on an input carrier. The transmission input shaft and output shaft are coaxial. An electromagnetic brake is used to control sun gear rotation and, thereby, output shaft speed.

Figure 12:
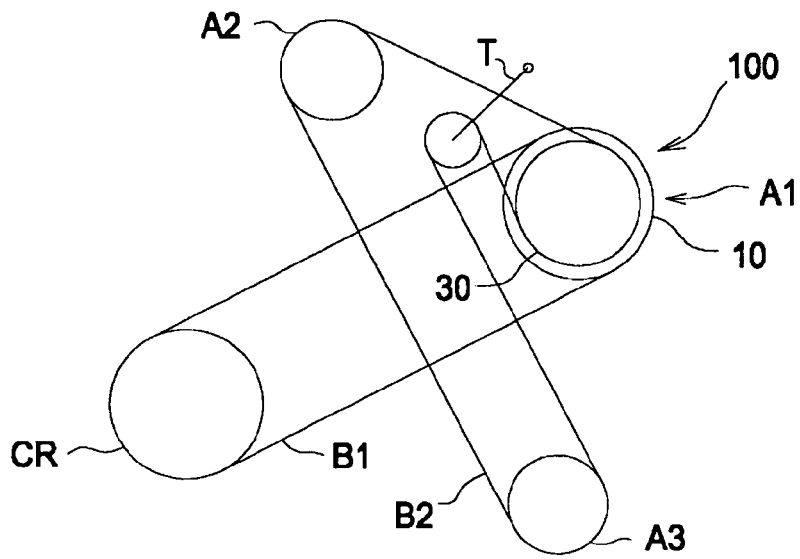
FIG. 12 is a schematic of a belt driven accessory drive.

An endless power transmission belt is drivingly engaged between a driver pulley such as an engine crankshaft CR, see FIG. 12, and a transmission input pulley 10. The belt may comprise a v-belt or multiple-ribbed belt, each known in the art. The belt may be replaced by a by a chain or toothed belt each know in the art.

Input pulley 10 is connected to the input carrier using fasteners known in the art. The input carrier comprises input carrier portion 11 and input carrier portion 20 which is disposed opposite input carrier portion 11, planetary gear members 15, and input shaft 200. A plurality of shafts 21 interconnect between portion 11 and portion 20. Each planetary gear member 15 is journalled to a shaft 21. Input carrier portion 20 is connected to input shaft 200.

Labyrinth seal 26 is connected to output pulley 30. O-ring seal 25 is disposed between shaft 19 and input carrier portion 11. Each seal is known in the art and prevents debris from entering the planetary gear set.

Ring gear 17 and sun gear 18 each have a gear mesh engagement with planetary gears 15. Sun gear 18 is disposed on shaft 19. Ring gear 17 is disposed on the output pulley 30. Shaft 19 rotates concentrically about input shaft 200 and output shaft 31. Planetary gears 15, sun gear 18 and ring gear 17 comprise straight cut gears. Use of straight cut gears negates the need for thrust bearings which might otherwise be needed with helical type gears. This significantly reduces the cost of the planetary gear train.

Brake 40 comprises a housing 52, an electromagnetic coil 41 and an axially moveable brake shoe 190 for frictional rotation stopping engagement. Brake shoe 190 of shaft 19 frictionally engages coil 41 when coil 41 is electrically activated, thereby stopping rotation of sun gear 18.

Input shaft 200 is journalled to brake housing 52 on bearings 23, 24. Bearings 23, 24 comprise ball bearings known in the art and are used to provide a proper support for brake 40. Other bearings known in the art may also be used, for example, needle or cone bearings.

Brake 40 is electromagnetically actuated to engage and stop rotation of portion 190 and thereby shaft 19 and sun gear 18 based upon an engine speed signal. Brake 40 is either engaged (shaft 19 stopped) or disengaged (shaft 19 rotates). Brake 40 is engaged at engine idle and disengaged for engine speeds above idle. Power is provided to the brake 40 coil by wires 410 from a vehicle electrical system, and may either be 12V or 42V or some other desired voltage.

Retainer clips 230, 231 and 240 retain bearings 23, 24 in place on input shaft 200. The clips also keep input shaft 200 properly spatially located with respect to brake housing 52.

Shaft 19 is journalled to input shaft 200 on sleeve bearing 50. A sleeve type bearing is sufficient for this service because the radial loads are minimal at idle when brake 40 is engaged, i.e., input shaft 200 is rotating and shaft 19 is locked up. At speeds greater than idle, brake 40 is disengaged and shaft 19 rotates in unison with input shaft 200 by operation of the one-way clutch 22, i.e., there is no differential rotation between shafts 19 and 200. Housing 52 can be mounted to an engine block or other mounting surface using known fasteners such as bolts, screws or studs engaged through bosses 53, 54.

One-way clutch 22 is disposed between input shaft 200 and output shaft 31. One-way, or sprag, clutch 22 is of a type known in the art, for example, a model GFK 5904 available from Warner Electric/Formsprag.

Planetary gears 15, belt bearing surface 33, bearing 50, and one-way clutch 22 are substantially coplanar in a radial direction with respect to an axis of rotation A-A. This arrangement has the benefit of minimizing or eliminating bending moments that might be imposed on the output portion of the transmission caused by a more axially staggered arrangement.

End 32 of output shaft 31 allows an accessory to be directly connected to the output shaft 31. End 32 can be used with any form of coupling known in the art, for example, keyed, keyless or splined. The accessory is directly connected to housing 52 using known fasteners, for example, bolts or screws, see FIG. 11. The accessory can comprise an alternator, air conditioner compressor, power steering pump, fuel pump, oil pump or any other rotary accessory. The directly coupled accessory is driven at the same speed as the output pulley 30.

Output pulley 30 engages an endless power transmission belt which transmits torque to other belt driven accessories in a belt drive system, see FIG. 12.

In operation a power transmission belt B1 engaged with a driver such as a crankshaft pulley CR transmits torque to input pulley 10. The transmission output pulley 30 then transmits torque through a second endless belt B2 which is drivingly connected to other belt driven accessories.

The transmission operates in one of two modes based upon engine speed. Brake status is a function of engine speed, i.e., the output pulley speed is determined in part by whether the brake is engaged or disengaged.

When brake 40 is engaged shaft 19 is held stationary with respect to the transmission housing, that is, shaft 19 does not rotate. Hence, sun gear 18 does not rotate. The input carrier drives planetary gears 15 on stationary sun gear 18. Rotation of the planetary gears 15 in turn drives ring gear 17 which in turn drives output pulley 30 and output shaft 31. The input/output pulley speed increase ratio in this mode is in the range of approximately 1.1 to 3.0 depending upon the relative diameters of the sun gear and ring gear. The preferred transmission ratio is in the range of approximately 1.3 to 1.8, although ratios outside this range are available for use if required by a particular system. The transmission ratio is the ratio of the transmission planetary gear set only and is independent of the pulley ratios, including the pulley ratio between the output pulley and the accessory pulley, as well as the ratio between the crankshaft CR pulley and the input pulley 10.

In a first operating mode brake 40 is engaged when the engine is started or operating at an idle speed. The brake is electrically engaged or disengaged by an engine speed signal provided by an engine control unit 500. Unit 500 may be formed as a computer system provided with known units including a CPU, a RAM, a ROM, a bi-directional communication bus, interface circuits (a signal conversion circuit and the like), and a memory. Unit 500 receives an engine speed signal from an sensor or instrument such as a tachometer 600, or other similar instrument for detecting rotational velocity known in the art such as a proximity detector.

When the engine is shut off, brake 40 is not engaged. When a key is inserted to start the engine, brake 40 is activated before the starter starts the engine. However, to ease the engine start, brake 40 can be activated slightly after the engine is running. In this case the one-way clutch drives the output shaft and the accessories are driven at a lower speed than required for idle, thereby minimizing the engine start power requirement. When the brake is disengaged the accessories are driven at a slower speed due to the pulley ratio between the output pulley 30 and an accessory pulley as described herein. The time delay between engine start and brake activation is approximately 0.5 to 1.0 seconds. After the time has elapsed brake 40 is engaged. More particularly, at engine start, or, as the engine speed slows below a desired level, for example approximately 1200-1500 RPM, the speed signal detected by an engine control unit 500 generates a control signal. The control signal activates the brake thereby stopping rotation of sun gear 18. As noted, this results in the output shaft 30 being driven through the planetary gears at a greater rotational speed than the driven input shaft 10. Of course, the engine speed at which brake 40 is activated is selected based upon the nature of the engine and its desired operating characteristics.

In this description the engine idle speed is approximately 800 RPM. The transition speed at which the brake is engaged or disengaged is approximately 1200-1500 RPM so that the accessory speed does not drop significantly below a minimum desired speed at idle, thereby avoiding the situation where the accessory or accessories are driven too slowly, even if only momentarily.

The second operating mode is when the engine is running at speeds greater than engine idle, for example at cruise or otherwise in excess of a pre-selected engine speed for example 1200-1500 RPM. Once the selected speed is detected by unit 500, brake 40 is disengaged. With the brake disengaged, shaft 19 is unlocked and sun gear 18 rotates in unison with the input carrier. One-way clutch 22 is engaged thereby driving output shaft 31 on a 1:1 basis with the input shaft 200.

However, the transmission ratio is only a part of the overall system by which the belt driven accessory drive speed is determined. The rotational speed of each accessory is also individually determined in part by the diameter of the accessory pulley and its ratio with respect to the output pulley 30. Therefore, the final belt driven accessory speed for a given engine speed is a function of the driver pulley (crankshaft) diameter, input pulley 10 diameter, transmission ratio, output pulley diameter 30, and the accessory pulley diameter. Each of these variables are selected and combined to give the desired final drive ration and hence belt driven accessory speed. The final drive ratio determines the accessory speed for a given crankshaft (engine) speed.

In an exemplary accessory drive system, it is estimated that the inventive transmission can provide fuel savings on the order of up to approximately 5% compared to a comparable engine without the transmission. The inventive system at engine speeds greater than idle decreases the rotational speed of the accessories. This improves engine and vehicle performance, including improved acceleration times and increased power available at the drive wheels.

In an exemplary system using a 2.0 L engine, the inventive system has the following operating characteristics.

| 2.0 L Engine (Comparison: Original (Prior Art) and Transmission) | | | | | | |
|---|---|---|---|---|---|---|
| | Pulley Diameters (mm) | | Accessory Speeds (RPM) - "Idle" | | Accessory Speeds (RPM) - "Off Idle" | |
| | Original Drive | Two Speed Module | Original Drive | Two Speed Module | Original Drive | Two Speed Module |
| Crank | 134.01 | 111.98 | 800 | 800 | 2500 | 2500 |
| AC | 146.01 | N/A | 734 | 734 | 2295 | 1458 |
| PS | 139.51 | 138.03 | 767 | 767 | 2402 | 1536 |
| Alt | 56.86 | 56.86 | 1866 | 1866 | 5833 | 3705 |
| WP | 107.50 | 106.38 | 998 | 998 | 3118 | 1981 |
| Input | N/A | 192.00 | N/A | 467 | N/A | 1458 |
| Output | N/A | 144.50 | N/A | 734 | N/A | 1458 |

In the first column the diameter in mm is given for each pulley as used on an original drive and on a drive system using the two speed transmission (two speed module). The nomenclature is as follows: "Crank"—crankshaft, "AC"—air conditioner, "PS"—power steering, "Alt"—alternator, "WP"—water pump. In this example system the air conditioner (AC) is directly connected to the output shaft 31 of the transmission, however, this is not intended to be limiting since any of the accessories may be directly connected to output shaft 31. At an engine speed referred to as "idle" for ease of reference, the two speed transmission is engaged, that is, brake 40 is engaged. "Idle" in this example is arbitrarily set at approximately 800 RPM. The transmission ratio is approximately 1.57. At idle the speed of the accessories as driven by the two speed transmission is the same as a proportional "original drive". An "original drive" is a prior art drive directly engaged with the crankshaft without a two speed transmission.

At an engine speed greater than idle, in this example 2500 RPM, brake 40 is disengaged. Therefore, one-way clutch 22 is operational resulting in input pulley 10 and output 30 pulley rotating in unison. Input pulley 10 and output pulley 30 each rotate at 1458 RPM. However, due to the pulley diameter for each accessory, one can see that each accessory rotates at a relatively slower speed as compared to the original prior art system. In this and the following example at idle, the pulley diameters are selected so that the respective pulley ratio between the output pulley 30 and each accessory pulley effectively negates the 1.57× relative speed increase caused by the transmission when brake 40 is engaged.

The final drive ratio in the 2.0 L engine example for the alternator at engine idle is approximately 2.33 (1866 RPM/800 RPM). At the "off idle" engine speed the final drive ratio for the alternator is approximately 1.48 (3705 RPM/2500 RPM). The inventive system imparts a final drive ratio for a belt driven accessory that is inversely related to engine speed. The inverse relationship of a pulley drive ratio to engine speed also applies to the accessory directly connected to and driven by the transmission, namely, the crankshaft pulley and the transmission input pulley.

At engine speeds greater than idle, the inventive system is given full reign when the brake 40 is disengaged and one-way clutch 22 is locked. The input 10 and output 30 pulleys rotate in unison. This combined with the accessory pulleys decreases the accessory rotational speed as compared to a prior art system. Reducing the accessory speed in this manner significantly increases overall fuel efficiency of the engine. It also increases torque available to the drive wheels. Of course, the pulley ratios can be selected to accommodate any engine accessory drive configuration.

In another example, a 5.3 L engine system is illustrated.

5.3 L Engine (Comparison: Original (Prior Art) and Transmission)

| | Pulley Diameters (mm) | | Accessory Speeds (RPM) - "Idle" | | Accessory Speeds (RPM) - "Off Idle" | |
|---|---|---|---|---|---|---|
| | Original Drive | Two Speed Module | Original Drive | Two Speed Module | Original Drive | Two Speed Module |
| Crank | 193.57 | 193.57 | 650 | 650 | 1500 | 1500 |
| AC | 111.9 | N/A | 1124.5 | 1124.5 | 2595 | 1648 |
| PS | 163.6 | 187.19 | 769 | 769 | 1775 | 1127 |
| Alt | 59.31 | 67.8 | 2121.6 | 2121.6 | 4896 | 3110 |
| WP | 150.8 | 172.46 | 834.6 | 834.6 | 1926 | 1223 |
| Input | N/A | 176.13 | N/A | 714.4 | N/A | 1648 |
| Output | N/A | 128 | N/A | 1124.5 | N/A | 1648 |

In this example, the transmission ratio is also approximately 1.57. The idle speed in this example is approximately 650 RPM as compared to 800 RPM for the previous example. The final drive ratio in this example for the alternator at engine idle is approximately 3.26 (2121.6 RPM/650 RPM). At the "off idle" engine speed the final drive ratio for the alternator is approximately 2.07 (3110 RPM/1500 RPM).

In each example, with respect to the A/C which is directly connected to output shaft 31, the directly connected accessory speed at engine idle corresponds to the pulley ratio between the crankshaft pulley and the input pulley 10 as modified by the transmission ratio. At engine speeds in excess of engine idle the directly connected accessory speed corresponds to the pulley ratio between the crankshaft pulley and the input pulley 10. At engine speeds above idle there is no additional effect due to the transmission ratio since the planetary gears are not operable and all rotation of the output shaft is caused by the one-way clutch 22.

The duty cycle for the transmission in the inventive system is approximately 5%, meaning the transmission is in operation (that is, brake engaged) approximately 5% of the time, basically when the engine is at idle. The duty cycle is dependent on the engine operating conditions and is preferably in the range of approximately 4% to 10% and may be as high as approximately 25% or 30%. On the other hand the prior art systems have a reciprocal duty cycle (~95%) since they operate a transmission when the engine is operated at speeds greater than idle. A low duty cycle is desirable because it extends the operating life of the transmission. It should again be understood that the term idle is used for ease of reference and is not intended to signify limiting the invention to particular engine speed. Idle speed can and does differ among various vehicles and engine types.

The system allows multiple accessories to be driven at two different speeds for any range of engine speeds. This first available accessory speed being that of the accessory which is directly connected to the output shaft 31. The second accessory speed being that of the belt driven accessory as further determined by the transmission ratio and respective pulley ratio of the transmission output pulley 30 and a particular driven accessory pulley.

The accessories can be selected and located in a belt drive system to optimize the beneficial effect of two available operational speeds. For example, the air conditioner or alternator can be directly connected to the transmission output shaft (32) while other belt driven accessories, such as a power steering pump or water pump, are driven at a different speed by a second belt from the output pulley 30.

The innovative compact design is realized by disposing the planetary gear train fully within the width (W) of the belt bearing portion 33 of the output pulley 30. Brake shoe 190 for the sun gear 18 is compactly disposed adjacent the input pulley 10. Hence the overall thickness of the transmission is substantially a function of the width of the pulley 10, pulley 30 and the width of brake 40. Depending upon electrical service requirements, conditions, brake 40 can be fully contained within a width (W2) of input pulley 10. Hence, the overall thickness of the transmission has a lower limit substantially bounded by the width of the input and output pulley in the closest possible proximity. For example, this can represent an overall end-to-end transmission thickness as small as approximately 45 mm. Assuming that at least a single belt width is a given in front end accessory drives, the inventive transmission allows a significant increase in fuel efficiency while only requiring an extra clearance space on the order of approximately 30 mm, and in certain cases less than 20 mm is required based on the overall width of an output belt B2.

Figure 2:
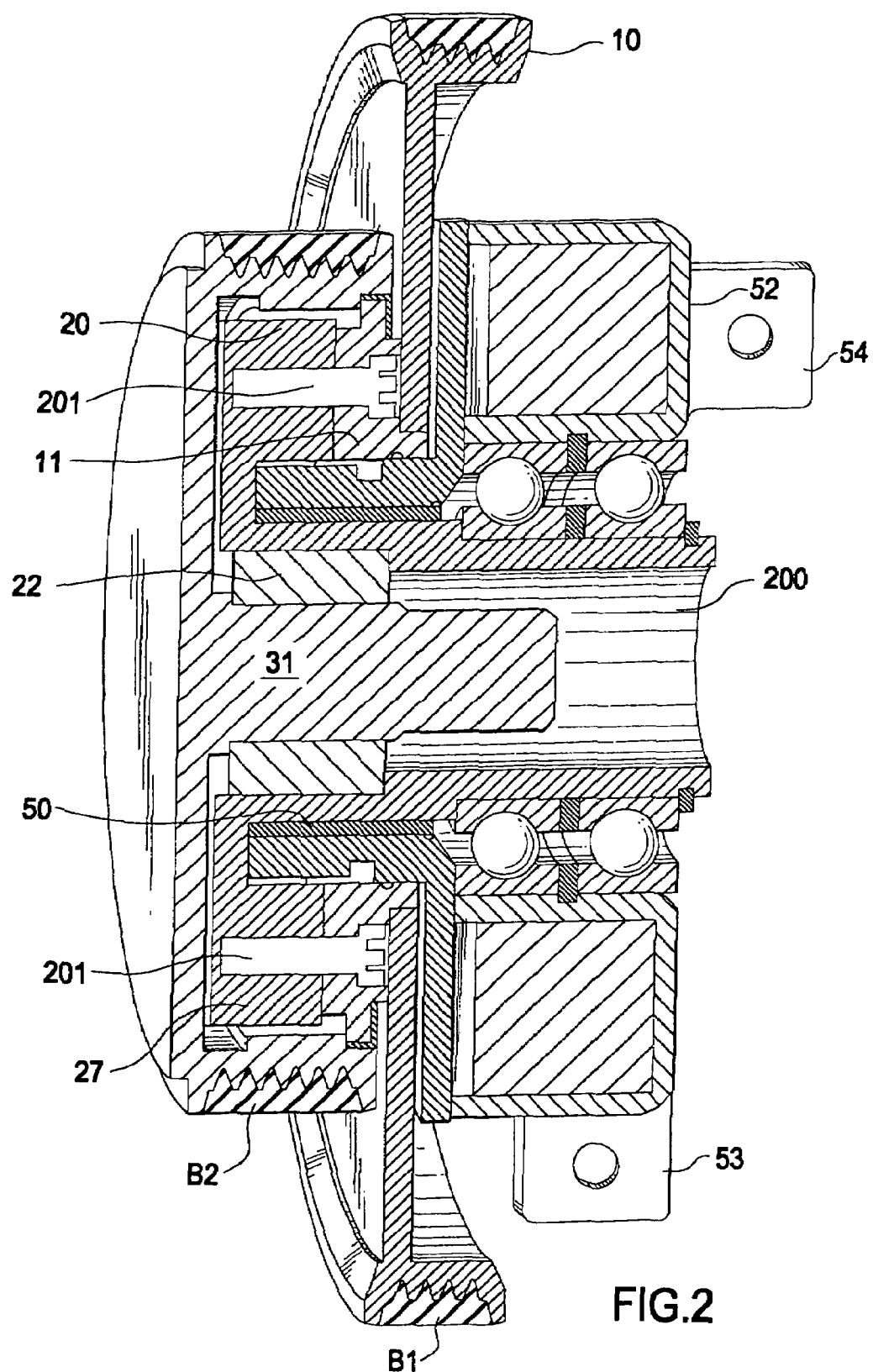
FIG. 2 is a cross-sectional view of the two speed transmission.

FIG. 2 is a cross-sectional view of the two speed transmission. Input carrier portion 11 and input carrier portion 20 are connected together with members 27 by fasteners 201.

Figure 4:
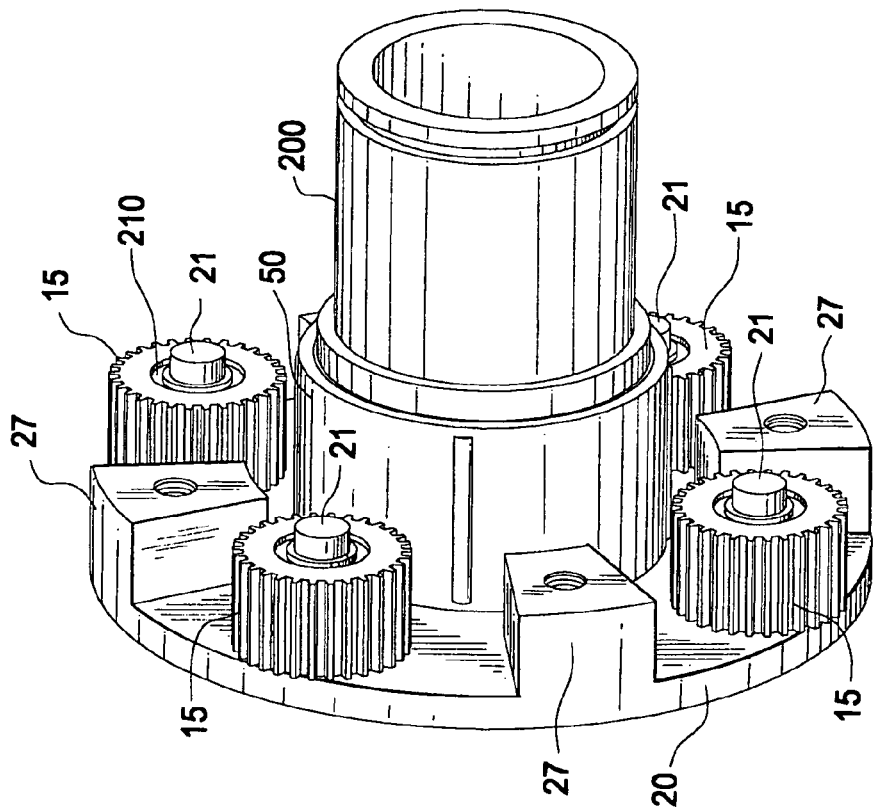
FIG. 4 is a partial perspective view of the planetary gears on the carrier.

Members 27 are circumferentially disposed about the input carrier, see FIG. 4. Input pulley 10, input carrier portion 11, input carrier portion 20 and input shaft 200 comprise an input rotating assembly. As described in FIG. 1 planetary gears 15 are journalled to the input carrier shafts 21. When brake 40 is disengaged, one-way clutch 22 is engaged and thereby drives output shaft 31. When brake 40 is engaged one-way clutch 22 is disengaged since output shaft 31 is rotating as a speed greater than the speed of input shaft 200.

Figure 3:
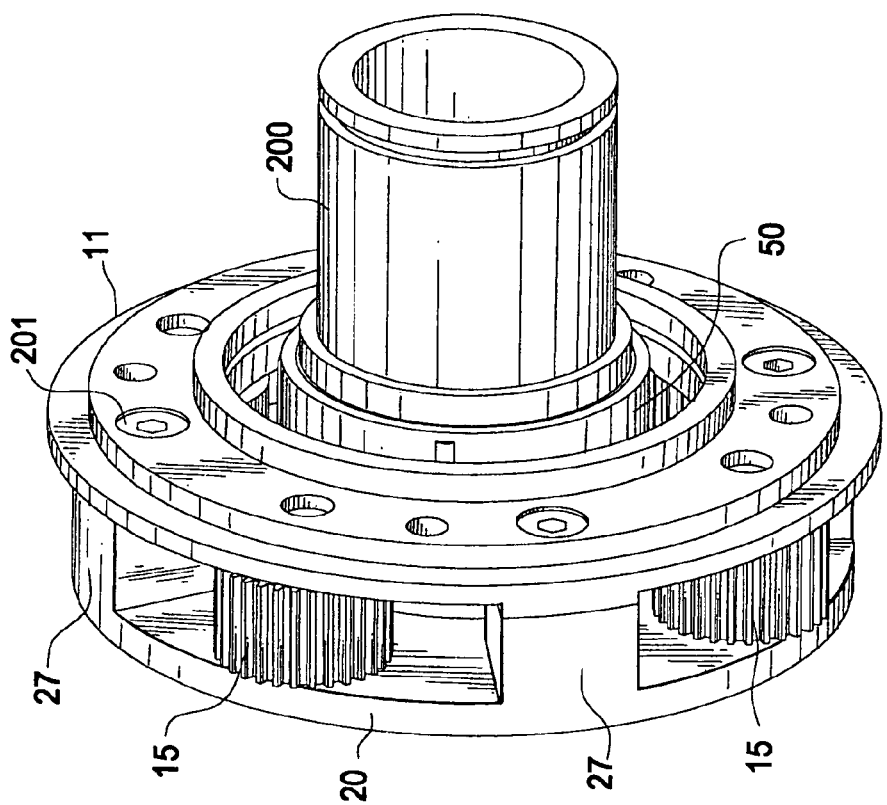
FIG. 3 is a perspective view of the planetary gear carrier.

FIG. 3 is a perspective view of the planetary gear carrier. Planetary gears 15 are disposed circumferentially about the carrier alternately interposed between members 27. Fasteners 201 connect portion 11 to members 27.

FIG. 4 is a partial perspective view of the planetary gears on the carrier. Each planetary gear 15 is journalled to a shaft 21 on a bearing 210 known in the art, such as a needle bearing or sleeve bearing. The bearing selection is dependent on the service conditions.

FIG. 5 is a partial perspective view of the planetary gear bearings and carrier sleeve bearing. Each planetary gear bearing 210 is disposed between a planetary gear 15 and a shaft 21. Carrier sleeve bearing 50 is disposed between input shaft 200 and output shaft 31.

Figure 6:
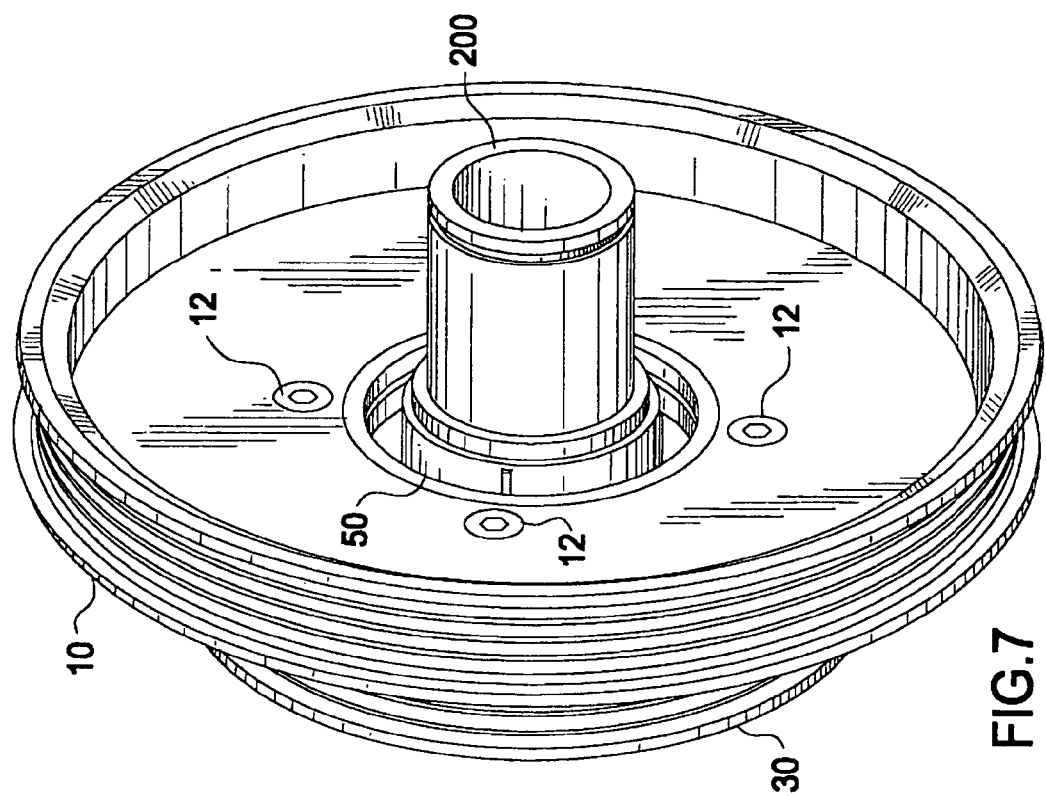
FIG. 6 is a partial perspective view of the carrier and output pulley.

FIG. 6 is a partial perspective view of the carrier and output pulley. The compact design of the transmission allows the planetary gear carrier to be fully contained within a width of the output pulley. Input shaft 200 comprises a bore 202 in which output shaft 31 is disposed.

Figure 7:
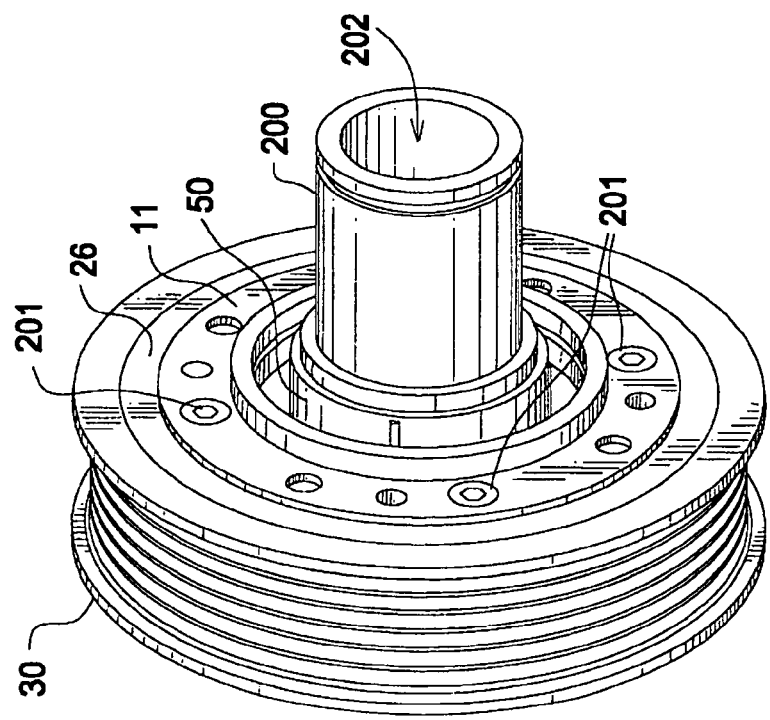
FIG. 7 is a partial perspective view of the carrier and output pulley and input pulley.

FIG. 7 is a partial perspective view of the carrier and output pulley and input pulley. Fasteners 12 attach input pulley 10 to input carrier portion 11. Input pulley 10 may also be attached to input carrier portion 11 by tack welding or any other suitable connecting means known in the art.

Figure 8:
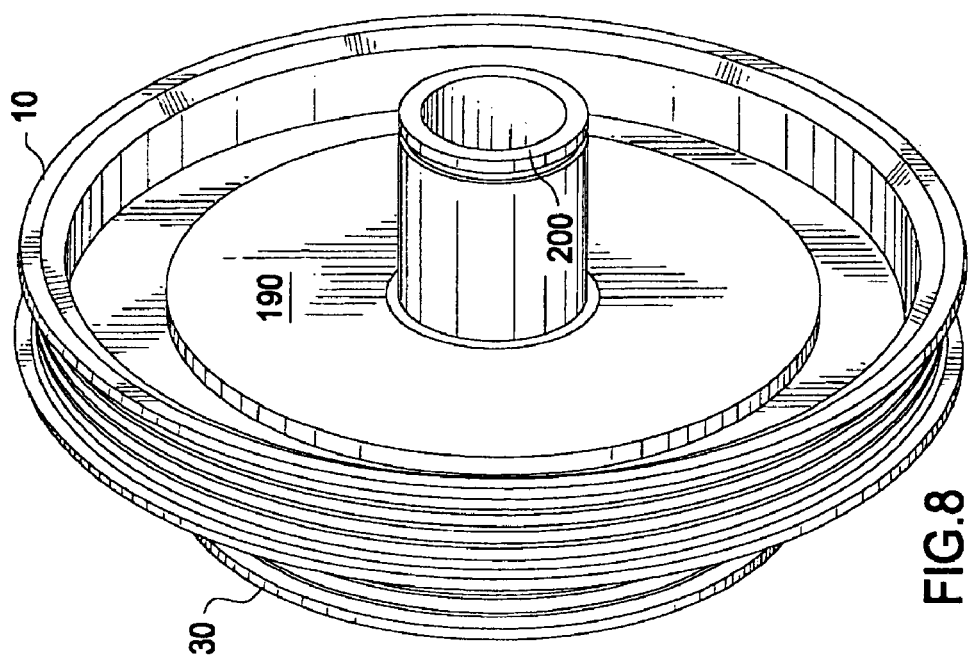
FIG. 8 is a partial perspective view of the carrier brake shoe and output pulley.

FIG. 8 is a partial perspective view of the carrier brake shoe and output pulley. Brake shoe 190 comprises a radially extending surface which frictionally engages coil 41 upon activation of said coil. Engagement of shoe 190 with coil 41 stops rotation of the sun gear 18. Brake shoe 190 is substantially contained within a width of input pulley 10.

Figure 9:
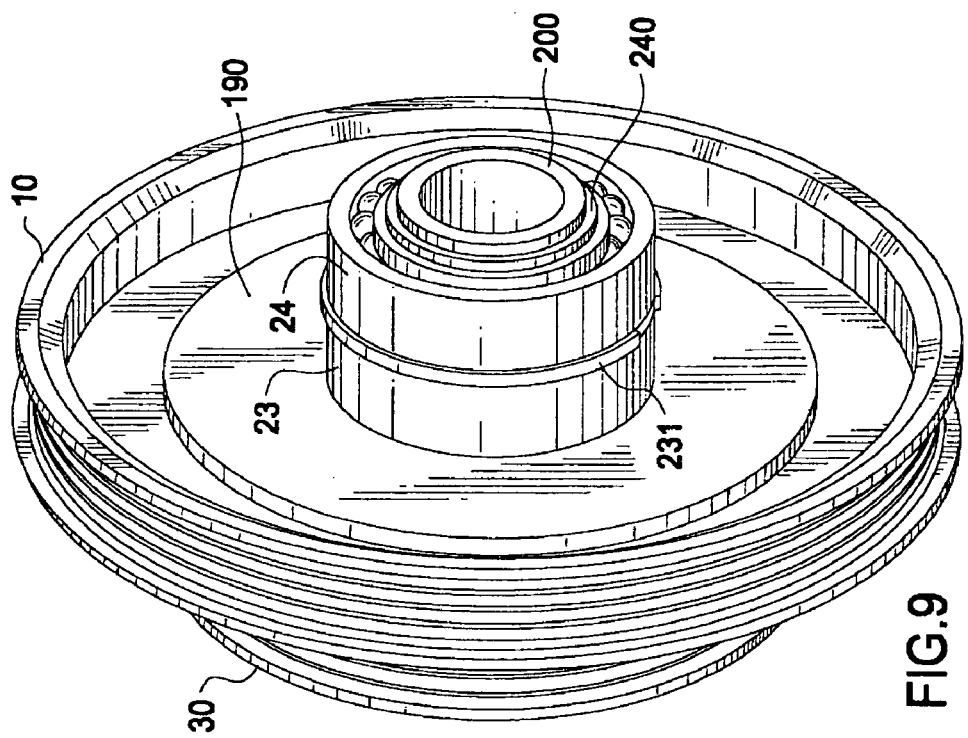
FIG. 9 is a partial perspective view of the bearings and carrier brake shoe.

FIG. 9 is a partial perspective view of the bearings and carrier brake shoe. Bearings 23, 24 support input shaft 200 on brake housing 52.

Figure 10:
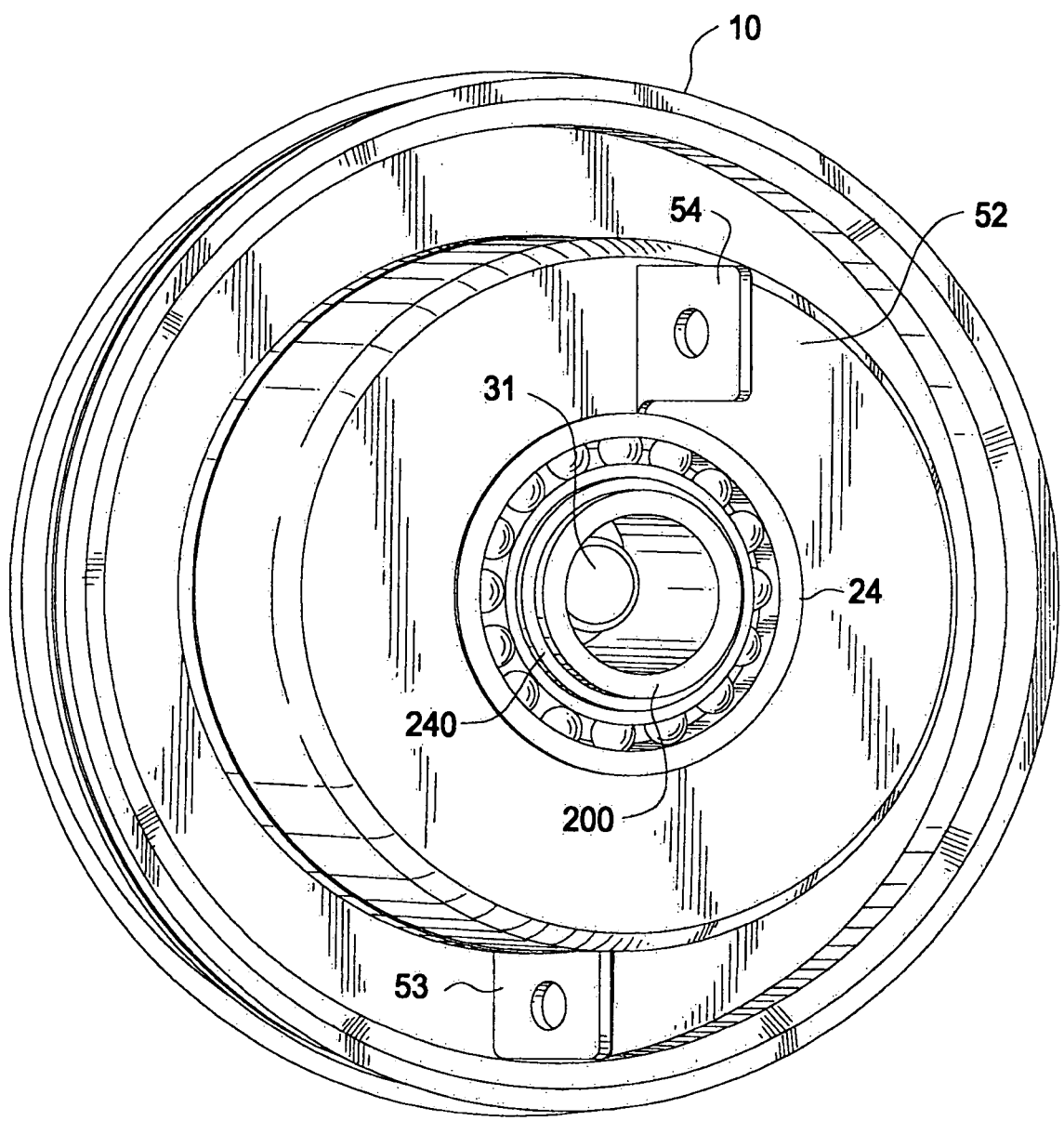
FIG. 10 is a perspective view of the transmission with the coil.

FIG. 10 is a perspective view of the transmission with the coil. Brake 40 axially locates and supports input shaft 200 on bearings 23, 24. Bosses 53, 54 are used with fasteners to connect the transmission to a mounting surface.

Figure 11:
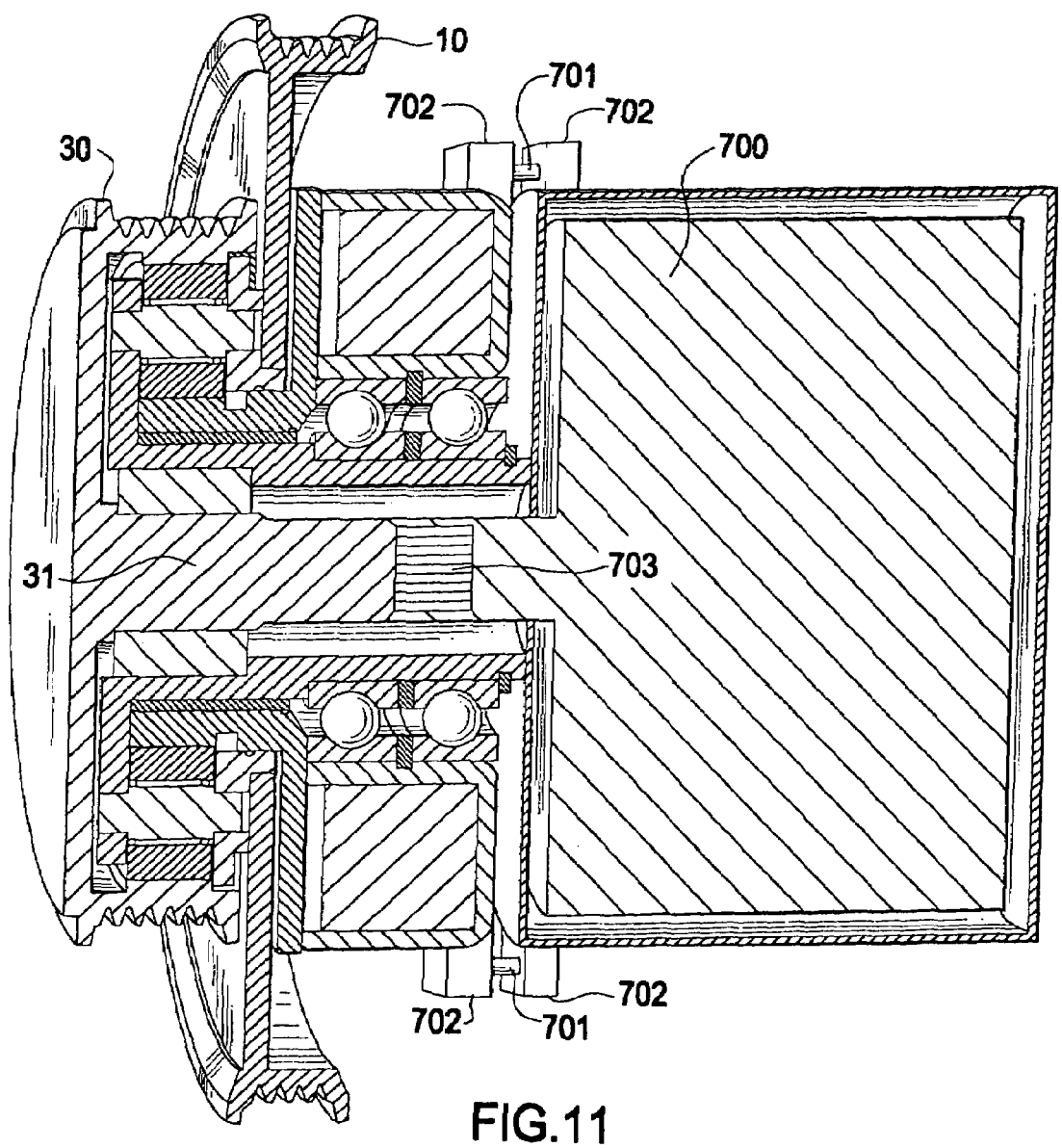
FIG. 11 is a cross-sectional view of the two speed transmission with an alternator connected to the transmission and coupled to the output shaft.

FIG. 11 is a cross-sectional view of the two speed transmission connected to an alternator 700. Alternator 700 is directly coupled to the output shaft 31. Alternator 700 is simply used as an example as any other accessory may be directly connected to the transmission as well. Direct coupling is accomplished by use of splines 703 on shaft 31, although any form of shaft coupling suitable for the service and known in the art is acceptable.

Tabs 702 extend from the transmission and alternator. Fasteners 701 connect tabs 702. Fasteners 701 comprise screws, bolts or studs for example. Alternator 700 is electrically connected to a vehicle electrical system in a manner known in the art.

FIG. 12 is a schematic of a belt driven accessory drive. Belt B1 is drivingly engaged between a crankshaft pulley CR and input pulley 10. Belt B2 is drivingly engaged between output pulley 30 and accessory pulleys A2 and A3. Belt B1 and B2 each comprise a multiple ribbed profile, see FIG. 2. An accessory A1 is directly coupled to the transmission 100. Accessory A1 may comprise an alternator 700. A belt tensioner T imposes a tension on belt B2. Tensioner T may comprise any tensioner known in the art, including an asymmetric tensioner, Zed type, or linear tensioner.

The asymmetric tensioner comprises a pulley pivotally mounted to a tensioner arm. The asymmetric tensioner comprises a damping mechanism that has a damping force which is greater in a first direction than in a second direction.

In an alternate embodiment, either belt, B1 or B2 or both, used in the inventive system comprises a low modulus belt known in the art. The low modulus belt comprises a belt having a tensile cord comprising nylon 4.6 or nylon 6.6 or a combination of the two. An elastic modulus of the belt is in the range of approximately 1500 N/mm to approximately 3000 N/mm. A feature of the low modulus belt is that it can be installed on a belt drive system without a tensioner or moveable shaft accessory. The low modulus belt is simply installed using a belt installation tool known in the art. The tool is used to roll or laterally urge the belt over an edge of a transmission pulley or accessory pulley without the need to otherwise adjust the center location of the pulley shaft. The low modulus belt is particularly suitable for belt B1 since equipping the transmission in such a way that it would otherwise be movable to allow installation and adjustment of belt B1 might be more expensive than simply designing the transmission to be directly connected to an engine mounting surface such as an engine block. Further, adjusting the transmission shaft location with respect to the crankshaft would consume more assembly time as well.

In yet another embodiment chains may be used in place of the belts.

Of course, transmission 100 and one or all of the accessories may also be provided with adjustable mounting means known in the art which allows the shaft location to be adjusted during installation.

Figure 13:
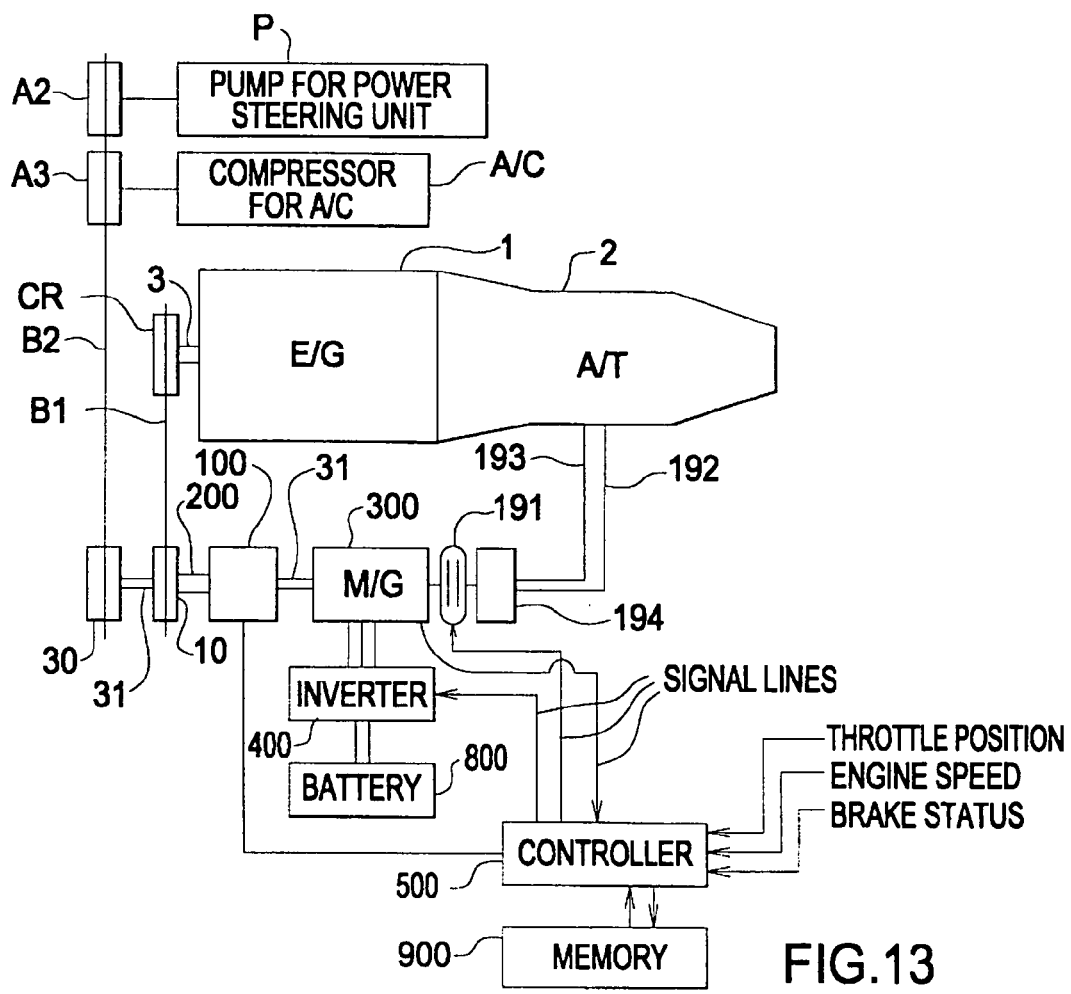
FIG. 13 is a schematic of the inventive transmission used in a generator motor application.

FIG. 13 is a schematic of the inventive transmission used in a generator motor application. Automatic transmission ("A/T") 2 is disposed adjacent to the engine ("E/G") 1. Motor generator 300 ("M/G") serves as a motor and an electric generator. Engine crank shaft 3, and shaft 31 and shaft 200 of the M/G 300 are disposed in parallel with each other. M/G 300 is directly connected to transmission 100 as described elsewhere in this specification. Transmission 100 is mechanically disposed between the M/G 300 and the crank shaft 3 so that the rotational speed of shaft 200 is reduced and transmitted to crank shaft 3. Pulley CR is connected to the crank shaft 3. Pulley 10 is connected to transmission 100 as described in this specification. Belt B1 is set between pulley CR and pulley 10. Pulley 30 is directly connected to shaft 31 of the M/G 300. Pulley 10 is operatively connected to shaft 200 by the planetary gear set.

Pump P for a power steering unit and a compressor A/C for an air conditioner are each an accessory included in the engine belt drive system. Pulleys A2 and A3 are secured to the respective ends of the rotational shafts of the pump P and the compressor A/C. A belt B2 is engaged among the pulleys 30, A2, and A3. The pulleys 30, A2, A3 and the belt B2 constitute a power transmission means for transmitting rotation of M/G 300 to the respective accessories.

An inverter 400 is electrically connected to M/G 300 and arranged to vary the amount of electric energy to be supplied from a battery 800 to the M/G 300 to control the speed of M/G 300 when M/G 300 is used in a motor mode. Inverter 400 also performs control to store electric energy generated by M/G 300 to battery 800.

M/G 300 is connected to an oil pump 194 for the A/T through electromagnetic clutch 191. An oil inlet pipe 192 is connected to the oil pump 194. An oil outlet pipe 193 is connected to the oil pump 194. Oil pimp 194 is connected to an engine lubrication system (not shown). The foregoing structure enables M/G 300 to operate the oil pump 194 by engaging electromagnetic clutch 191 while the engine is stopped. This is because the starting clutch (not shown) disposed in the A/T is arranged to be immediately engaged for driving the vehicle smoothly upon re-start of the engine.

Referring again to FIG. 13, controller 500 transmits to inverter 400 a signal for controlling the engine running mode switching operation, ON-OFF control signals to the electromagnetic clutch 191 and ON-OFF control signals to the electromagnetic coil 41 of the transmission. Controller 500 also receives signals from various sensors disposed on the vehicle and on the engine that are indicative of a vehicle operating condition and/or of an engine operating condition. These include a signal indicating the speed of M/G 300, a signal for switching the engine running mode, a signal for switching the operation of the air conditioner, an engine status signal indicating, for example, the speed of the engine 1, a vehicle status signal (not shown) indicating the vehicle speed and the like, a wheel brake status signal, an engine throttle position signal, and a status signal of the A/T indicating the range selected by the shift lever. The brake status signal indicates the state of engagement of each wheel brake or all wheel brakes on the vehicle. The throttle position signal relates to the position of the throttle, which is indicative of the driver demand to the engine such as acceleration, deceleration, non-accelerating cruise or idle. Each signal may be either analogue or digital.

In accordance with information indicated by the above-mentioned signals controller 500 performs an operation for reading data from a memory 900 and a calculating operation to determine an engine first running mode (engine operating) or a second running mode (engine not operating). Then controller 500 transmits control signals to the transmission brake coil 41, the inverter 400, and electromagnetic clutch 191. Controller 500 may be formed as a computer system provided with known units including a CPU, a RAM, a ROM, a bi-directional communication bus, interface circuits (a signal conversion circuit and the like), and a memory 900.

The operation will now be described. Initially, M/G 300 is operated to start the engine 1. After starting the engine 1, M/G 300 acts as a power generator for storing electric energy in the battery 800. When the engine is started, the controller 500 detects the speed of M/G 300. Moreover, controller 500 causes inverter 400 to perform a switching operation such that a torque and speed required to start the engine 1 are realized. For example, if a signal for switching the air conditioner A/C has been turned ON at engine start, a higher torque is required compared with the OFF state of the A/C. Therefore, controller 500 applies to inverter 400 a switching control signal to allow M/G 300 to rotate at a higher torque with a greater speed.

The switching control signal may be determined such that a variety of status signals of the engine 1, the A/T 2 and the vehicle are provided to the controller 500 and thereby collated with a map memory stored in the memory. Alternatively, the switching control signal may be determined by calculations performed by the processor unit (CPU) disposed in controller 500.

When an engine stop signal is turned ON controller 500 stops the engine 1 by transmitting a signal for interrupting fuel supply to the engine 1 for example to an electric fuel pump (not shown). The engine stop operation can be performed under a condition where, for example, the vehicle speed is zero, the brakes are partially or fully applied, and the shift lever is in the D or N setting. Thus, no power is transmitted between the pulley 10 and the engine 1. In this state, electromagnetic clutch 191 can be brought to a connected state to allow M/G 300 to operate the oil pump 194 while engine 1 is off. This is because the starting clutch (not shown) disposed in the A/T 2 is arranged to be immediately engaged for driving the vehicle smoothly upon re-starting of the engine.

In the case where the air conditioner and the power steering are required to be operated even if the engine 1 is stopped, controller 500 applies to inverter 400 a switching control signal to rotate the M/G 300 at the speed and torque corresponding to the loads of the pump P for a power steering unit, the compressor A/C for the air conditioner and the oil pump 190 for the A/T 2. In this case brake 41 is OFF or disengaged.

When the engine 1 is re-started from a state where the vehicle is stopped, M/G 300 in motor mode cranks engine 1 when brake coil 41 is turned ON thereby stopping rotation of sun gear 18. Brake coil 41 is energized causing pulley 10 to rotate at a predetermined speed and torque. Thus, the rotational force of M/G 300 is transmitted at a decreased speed from the ring gear 17 to the carrier 11 and thereby to pulley 10 and thereby to crankshaft pulley CR.

When the M/G 300 is used as an electric generator, and/or the accessories are operated while engine 1 is operating in a first running mode, brake coil 41 is turned OFF and one-way clutch 22 is in an engaged state. Thus, M/G 300 and the pulley 10 are rotationally connected with each other so that the rotations of pulley 10 are transmitted through clutch 22 to the M/G 300 via shaft 31.

When the pump P and the compressor A/C are operated by M/G 300 in motor mode while engine 1 is stopped, brake coil 41 is turned OFF. In this second running mode engine 1 is stopped and pinion gears 15 and sun gear 18 rotate freely. Carrier 11 and pulley 10 do not rotate because they are engaged with belt B1 which is engaged with stopped crankshaft pulley CR. Since brake 41 is OFF, sun gear 18 rotates in a direction opposite that of ring gear 17 and pulley 30. In effect, this configuration acts as though the transmission 100 in placed in a 'neutral' gear thereby preventing transmission of torque from pulley 30 to pulley 10.

Transmission 100 is operating in part as a clutch to control transmission of torque to the engine, or to receive torque from the engine depending on the mode selected.

Figure 14:
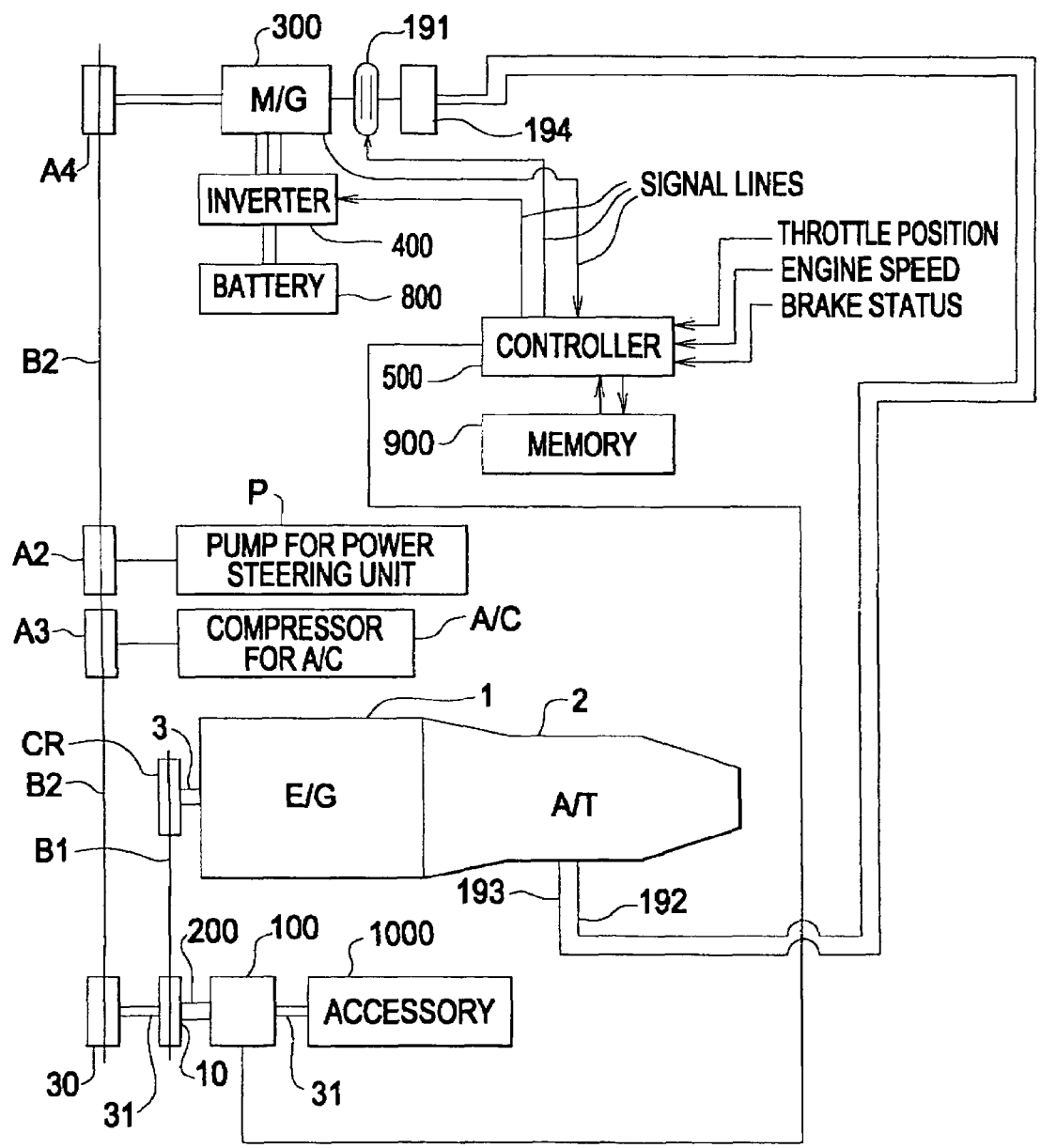
FIG. 14 is a schematic of the inventive transmission in an alternate generator motor arrangement.

FIG. 14 is a schematic of the inventive transmission in an alternate generator motor arrangement. Generally, the components and their relationship in this alternate embodiment are as described in FIG. 13, with the differences described herein.

In this alternate embodiment M/G 300 is not directly attached to transmission 100. Transmission 100 has no directly connected accessory. M/G 300 is connected to transmission 100 by belt B2. Torque is transmitted to and from transmission 100 by belt B1 and B2 between engine 1, M/G 300 and the accessories. Transmission 100 is directly mounted to engine 1 using fasteners such as bolt or screws.

This embodiment illustrates that the M/G can be connected, either directly or by belt, to either end of transmission output shaft 31. This provides alternate belt drive arrangements in which the inventive transmission can be successfully used.

In operation, when the engine 1 is re-started from a state where the vehicle is stopped at a stop light for example, M/G 300 in motor mode cranks engine 1 through belt B2, transmission 100, and belt B1 when brake coil 41 is turned ON, thereby engaging the brake and stopping rotation of sun gear 18. Energizing brake coil 41 causes pulley 10 to rotate at a predetermined speed and torque. Thus, the rotational force of M/G 300 is transmitted at a decreased speed through belt B2, to pulley 30 to ring gear 17 to the carrier 11 and thereby to pulley 10 and thereby to crankshaft pulley CR through belt B1. Due to the configuration of belt B2, accessories P and A/C are rotated while the M/G 300 is operating in motor mode during engine start as well.

When the M/G 300 is used as an electric generator, and/or the accessories are operated while engine 1 is operating in a first running mode, brake coil 41 is turned OFF and one-way clutch 22 is in an engaged state. Thus, pulley 30 and pulley 10 are directly connected with each other so that the rotations of pulley 10 are transmitted to pulley 30 and thereby to the accessories P, A/C and M/G 300 through belt B2.

When the pump P and the compressor A/C are operated by M/G coil 41 is turned OFF. In this second running mode engine 1 is stopped and pinion gears 15 and sun gear 18 rotate freely. Carrier 11 and pulley 10 do not rotate because they are engaged with belt B1 which is engaged with stopped crankshaft pulley CR. Since brake 41 is OFF, sun gear 18 rotates in a direction opposite that of ring gear 17 and pulley 30, thereby allowing M/G 300 to operate accessories P and A/C through belt B2 without also starting engine 1.

In yet another alternate embodiment, an accessory 1000 may be directly coupled to transmission 100 as described in FIG. 11. Accessory 1000 may comprise a fuel pump, oil pump or any other accessory as may be required by an engine or vehicle. In this embodiment accessory 1000 is directly connected to transmission 100 and to shaft 31. Due to the unique arrangement of coaxial shafts 31, 200 of transmission 100, accessory 1000 is fully operable by M/G 300 along with the other accessories even when engine 1 is not operating and M/G 300 is in motor mode. Of course, accessory 1000 is also driven by engine 1 along with accessories P and A/C when engine 1 is operating and M/G 300 is operated as a generator.

Although forms of the invention have been described herein, it will be obvious to those skilled in the art that variations may be made in the construction and relation of parts without departing from the spirit and scope of the invention described herein.

I claim:

1. A two speed transmission comprising:
   a planetary gear train comprising an input member connected to an input carrier, the input carrier connected to an input shaft, the input shaft is radially inward of the input member;
   a sun gear and a ring gear;
   the input carrier comprising a plurality of planetary members each in meshing engagement with the sun gear and the ring gear;
   the sun gear connected to a brake member;
   the ring gear connected to an output member comprising a pulley; and
   a one-way clutch engaged between the input shaft and the output member.

2. The two speed transmission as in claim 1, wherein the input member comprises a pulley.

3. The two speed transmission as in claim 1, wherein the planetary gear train is substantially disposed within an output member width.

4. The two speed transmission as in claim 2, wherein the brake member is substantially disposed within an input member width.

5. The two speed transmission as in claim 1, wherein the output member further comprises means for direct connection to an accessory.

6. The two speed transmission as in claim 1, wherein the input member and the output member are coaxial.

7. The two speed transmission as in claim 1 wherein the brake is electromagnetic.

8. The two speed transmission as in claim 1 further comprising:
   a bearing disposed between the brake and the input shaft; and
   a bearing disposed between the sun gear and the input shaft.

* * * * *